United States Patent
Nakamura

(10) Patent No.: US 9,403,065 B2
(45) Date of Patent: *Aug. 2, 2016

(54) GOLF CLUB

(71) Applicant: DUNLOP SPORTS CO. LTD., Kobe-shi, Hyogo (JP)

(72) Inventor: Takashi Nakamura, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 11 days.

This patent is subject to a terminal disclaimer.

(21) Appl. No.: 14/492,803

(22) Filed: Sep. 22, 2014

(65) Prior Publication Data

US 2015/0087435 A1    Mar. 26, 2015

(30) Foreign Application Priority Data

Sep. 20, 2013   (JP) ................................. 2013-196099

(51) Int. Cl.
| | | |
|---|---|---|
| *A63B 53/10* | (2015.01) | |
| *A63B 53/00* | (2015.01) | |
| A63B 53/04 | (2015.01) | |
| B29L 31/52 | (2006.01) | |

(52) U.S. Cl.
CPC .................. *A63B 53/00* (2013.01); *A63B 53/10* (2013.01); *A63B 60/42* (2015.10); *A63B 2053/0408* (2013.01); *B29L 2031/5227* (2013.01)

(58) Field of Classification Search
CPC ................... A63B 53/00; A63B 53/10; A63B 2053/0408; A63B 60/42; B29L 2013/5227
See application file for complete search history.

(56) References Cited

U.S. PATENT DOCUMENTS

| | | | | |
|---|---|---|---|---|
| 5,569,097 A | * | 10/1996 | Veux ...................... | A63B 53/00 473/292 |
| 2004/0192462 A1 | | 9/2004 | Ashida et al. | |
| 2010/0041492 A1 | * | 2/2010 | Rice ........................ | A63B 53/10 473/289 |
| 2012/0129622 A1 | | 5/2012 | Naruo et al. | |
| 2013/0095944 A1 | | 4/2013 | Nakamura et al. | |

FOREIGN PATENT DOCUMENTS

| | | | | |
|---|---|---|---|---|
| JP | 2-255163 | * | 10/1990 | |
| JP | 11-285550 A | | 10/1999 | |
| JP | 2004-201911 A | | 7/2004 | |
| JP | 2004-313781 A | | 11/2004 | |
| JP | 2011-235024 A | | 11/2011 | |
| JP | 2013-81688 A | | 5/2013 | |
| JP | 2596837 A1 | * | 5/2013 | ........... A63B 53/047 |

* cited by examiner

*Primary Examiner* — Stephen Blau

(74) *Attorney, Agent, or Firm* — Birch, Stewart, Kolasch & Birch, LLP

(57) ABSTRACT

A club 2 includes a head 4, a shaft 6 and a grip 8. A club length L1 is equal to or greater than 43 inches and equal to or less than 48 inches. A frequency of the club is equal to or greater than 240 (cpm) and equal to or less than 290 (cpm). A club inertia moment Ix is equal to or greater than $6.90 \times 10^3$ (kg·cm$^2$) and equal to or less than $7.50 \times 10^3$ (kg·cm$^2$). A ratio Iss/Ix is equal to or greater than 0.085 and equal to or less than 0.115. The inertia moment Ix is a club inertia moment about a swing axis Zx. The moment Iss is a shaft inertia moment about the swing axis Zx.

5 Claims, 7 Drawing Sheets

GOLF CLUB

The present application claims priority on Patent Application. No. 2013-196099 filed in Japan on Sep. 20, 2013, the entire contents of which are hereby incorporated by reference.

BACKGROUND OF THE INVENTION

1. Field of the Invention

The present invention relates to a golf club.

2. Description of the Related Art

It is a flight distance that is an important item to evaluate a golf club.

The invention that aims for increasing a flight distance is proposed. Japanese Patent Application Laid-Open Publication No. 2004-201911 discloses a wood club in which the mass ratio of a head in the total mass of the golf club is equal to or greater than 73% and equal to or less than 81%. The kinetic energy of the head can be increased because of a large mass of the head. The initial velocity of a ball can be increased because of the collision against the head having a large kinetic energy.

SUMMARY OF THE INVENTION

The head speed is decreased only by simply increasing a head weight. It is not easy to swing a club whose head weight is simply increased. More specifically, advanced golf players are sensitive to the ease of a swing. The ease of a swing can contribute to an increase in the flight distance.

Demand for the flight distance has been increased. The present invention enables an increase in a flight distance based on technical ideas different from previously existing ones.

It is an object of the present invention to provide a golf club easy to take a swing and excellent in a flight distance performance.

A preferred golf club according to an aspect of the present invention includes a head, a shaft, and a grip. A club length is equal to or greater than 43 inches and equal to or less than 48 inches. A frequency of the club is equal to or greater than 240 (cpm) and equal to or less than 290 (cpm). A shaft inertia moment about a swing axis is defined as Iss (kg·cm$^2$) and a club inertia moment about the swing axis is defined as Ix (kg·cm$^2$). The club inertia moment Ix is equal to or greater than $6.90 \times 10^3$ (kg·cm$^2$) and equal to or less than $7.50 \times 10^3$ (kg·cm$^2$). Iss/Ix is equal to or greater than 0.085 and equal to or less than 0.115. A club weight is defined as Wc (kg), an axial direction distance from a grip end to a center of gravity of the club is defined as Lc (cm), a club inertia moment about a center of gravity of the club is defined as Ic (kg·cm$^2$), a shaft weight is defined as Ws (kg), an axial direction distance from the grip end to a center of gravity of the shaft is defined as Ls (cm), and a shaft inertia moment about the center of gravity of the shaft is defined as Is (kg·cm$^2$).

The inertia moment Ix is calculated by Equation (1), and the inertia moment Iss is calculated by Equation (2):

$$Ix = Wc \times (Lc+60)^2 + Ic \quad (1)$$

$$Iss = Ws \times (Ls+60)^2 + Is \quad (2)$$

Preferably, the shaft inertia moment Iss (kg·cm$^2$) is equal to or less than 900.

Preferably, a grip inertia moment Igs (kg·cm$^2$) about the swing axis is equal to or less than 280. A grip weight is defined as Wg (kg), an axial direction distance from the grip end to a center of gravity of the grip is defined as Lg (cm), and a grip inertia moment about a center of gravity of the grip is defined as Ig (kg·cm$^2$). The inertia moment Igs is calculated by Equation (3):

$$Igs = Wg \times (Lg+60)^2 + Ig \quad (3)$$

It is possible to obtain a golf club easy to take a swing and excellent in a flight distance performance.

DESCRIPTION OF THE PREFERRED EMBODIMENTS

In the following, the present invention will be described in detail based on preferred embodiments with appropriate reference to the drawings.

It is noted that in the present application, the term "axial direction" means the axial direction of a shaft.

Figure 1:
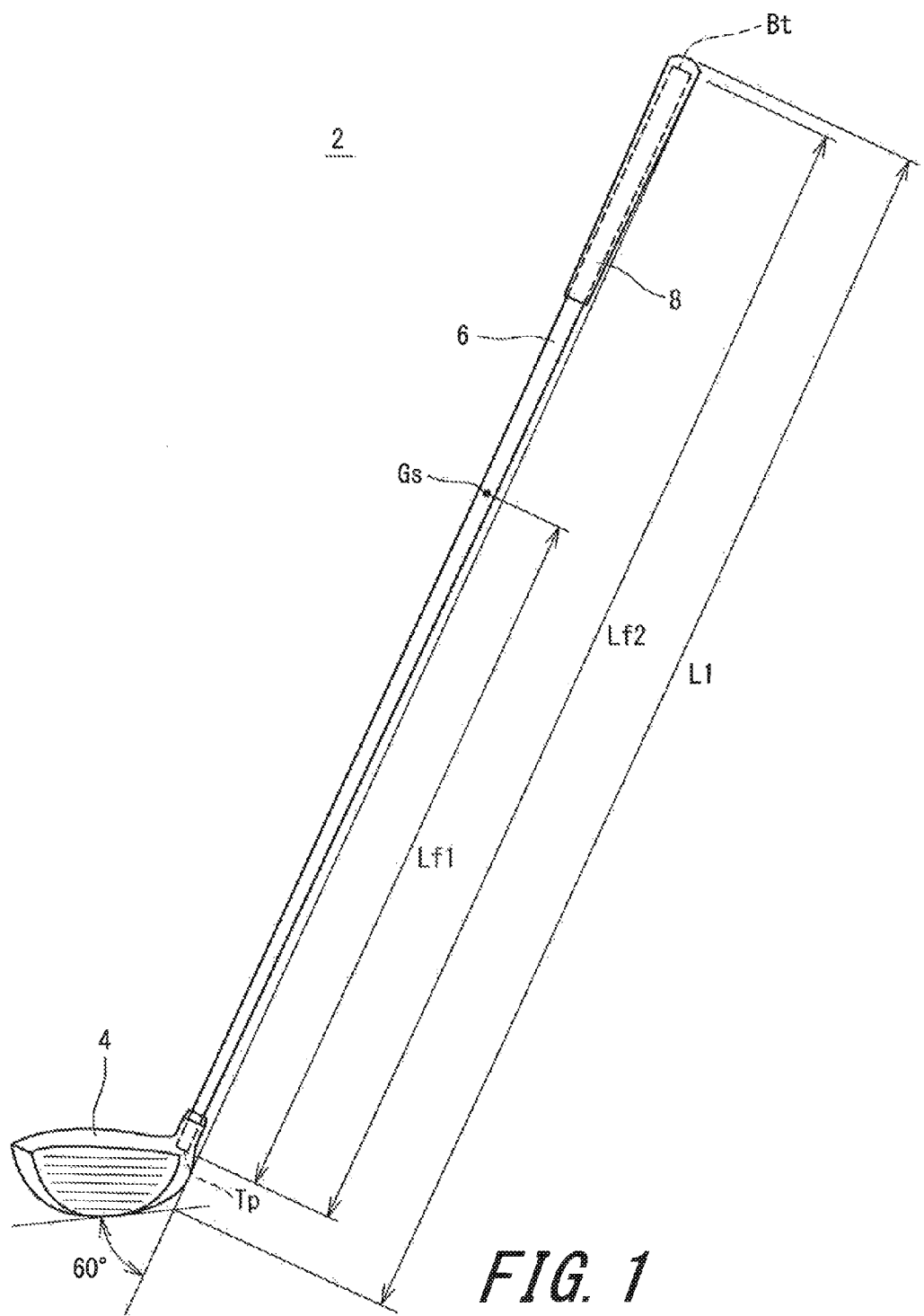
FIG. 1 shows a golf club according to an embodiment of the present invention.

FIG. 1 shows a golf club 2 according to an embodiment of the present invention. The golf club 2 includes a head 4, a shaft 6, and a grip 8. The head 4 is mounted on the tip end part of the shaft 6. The grip 8 is mounted on the butt end part of the shaft 6. The head 4 has a hollow structure. The head 4 is a wood type. The golf club 2 is a driver (a number 1 wood).

The embodiment is effective in improving a flight distance performance. The club length is preferably equal to or greater than 43 inches. From these viewpoints, preferably, the head 4 is a wood golf club head. Preferably, the golf club 2 is a wood golf club.

The shaft 6 is formed of a laminate of fiber reinforced resin layers. The shaft 6 has a tubular body. The shaft 6 has a hollow structure. As illustrated in FIG. 1, the shaft 6 includes a tip end Tp and a butt end Bt. The tip end Tp is located in the head 4. The butt end Bt is located in the grip 8.

In FIG. 1, a two-directional arrow Lf2 expresses a shaft length. The shaft length Lf2 is an axial direction distance between the tip end Tp and the butt end Bt. In FIG. 1, a two-directional arrow Lf1 expresses an axial direction distance from the tip end Tp to a shaft gravity center Gs. The shaft gravity center Gs means the center of gravity of the shaft 6 alone. The gravity center Gs is located on the shaft axis. In FIG. 1, a two-directional arrow L1 expresses the club length. A measurement method for the club length L1 will be described later.

The shaft 6 is a so-called carbon shaft. The shaft 6 is preferably formed by curing prepreg sheets. In the prepreg sheet, fibers are aligned substantially in one direction. The prepreg in which fibers are aligned substantially in one direction is also referred to as a UD prepreg. "UD" stands for a uni-direction. It may be fine to use a prepreg other than the UD prepreg. For example, the prepreg sheet may include a woven fiber.

The prepreg sheet includes a fiber and a resin. The resin is also referred to as a matrix resin. Typically, the fiber is a carbon fiber. Typically, the matrix resin is a thermosetting resin.

The shaft 6 is manufactured by a so-called sheetwinding method. In the prepreg, the matrix resin is in a semi-cured state. The shaft 6 is formed by winding and curing prepreg sheets.

The matrix resin for the prepreg sheet can include epoxy resins and can also include thermosetting resins other than epoxy resins, and thermoplastic resins. From the viewpoint of shaft strength, epoxy resins are preferable to the matrix resin.

A method for manufacturing the shaft 6 is not limited. From the viewpoint of the degree of freedom for design and decreasing the weight, a shaft manufactured by a sheetwinding method is preferable.

Figure 2:
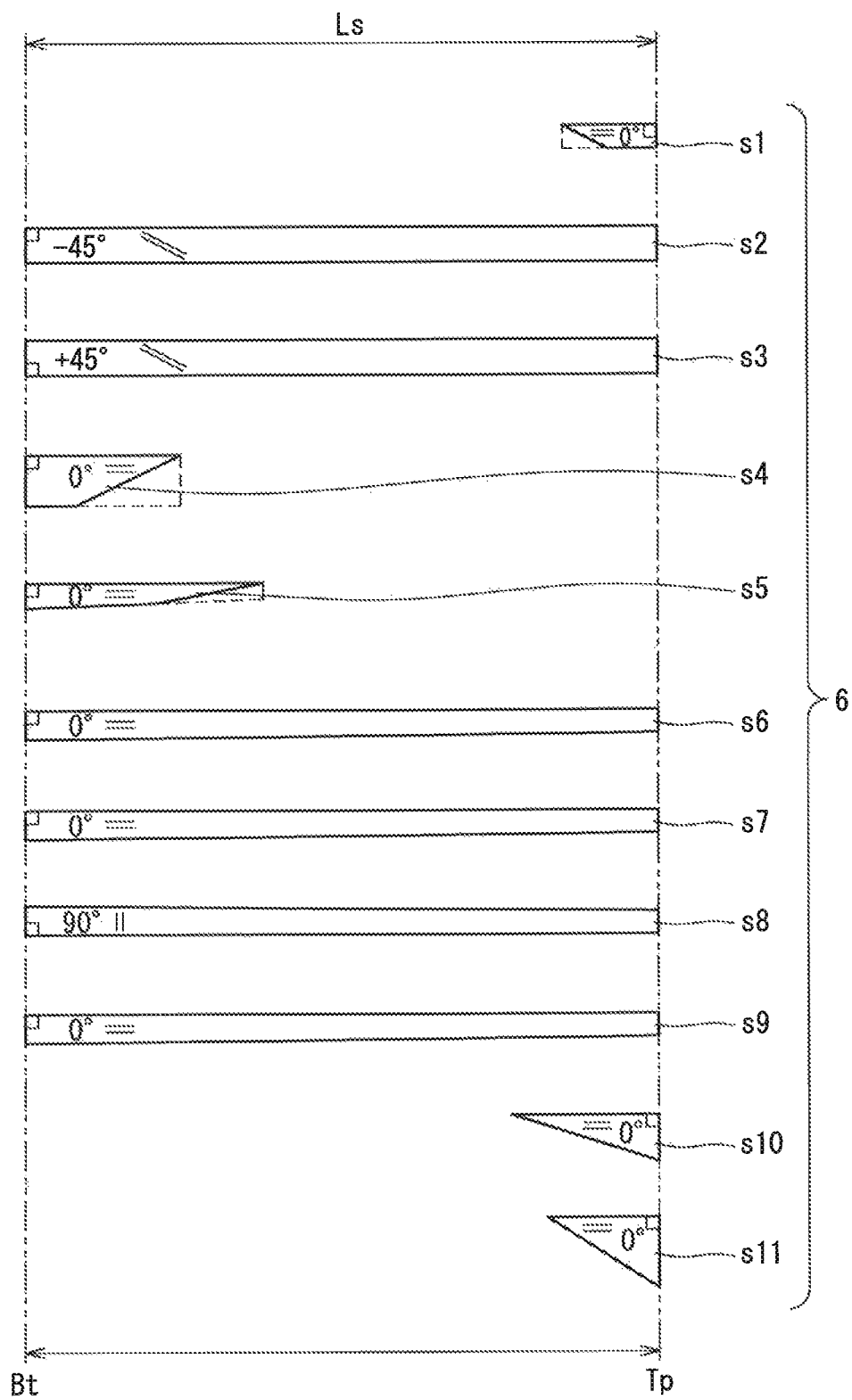
FIG. 2 is a development view of prepreg sheets configuring a shaft used in the club illustrated in FIG. 1.

FIG. 2 is a development view of prepreg sheets configuring the shaft 6 (a configuration diagram of sheets). The shaft 6 is configured of a plurality of sheets. The shaft 6 is configured of eleven sheets from a first sheet S1 to an eleventh sheet s11. The development view illustrated in FIG. 2 shows the sheets configuring the shaft in order from the inner side in the radial direction of the shaft. The sheets are wound in order from the sheet located on the upper side in the development view. In FIG. 2, the lateral direction in the drawing is corresponds to the axial direction of the shaft. In FIG. 2, the right side in the drawing is the tip end Tp side of the shaft. In FIG. 2, the left side in the drawing is the butt end Bt side of the shaft.

The development view illustrates the order of winding the sheets as well as the disposition of the sheets in the shaft axial direction. For example in FIG. 2, the tip ends of the sheets s1, s10, and s11 are located at the shaft tip end Tp. For example in FIG. 2, the back ends of the sheets s4 and s5 are located at the shaft butt end Bt.

In the present application, the term "layer" and the term "sheet" are used. The term "layer" is wound, and the term "sheet" is not wound. A "layer" is formed by winding a "sheet". That is, a wound "sheet" forms a "layer". Moreover, in the present application, the same reference numerals and signs are used for the layer and the sheet. For example, a layer formed of the sheet s1 is a layer s1.

The shaft 6 includes a straight layer, a bias layer, and a hoop layer. In the development view of the present application, an orientation angle Af of the fiber is denoted in the sheets. The orientation angle Af is an angle with respect to the shaft axial direction.

The sheet having the notation "0 degree" configures the straight layer. The sheet for the straight layer is also referred to as a straight sheet in the present application.

The straight layer is a layer that the fiber orientation is substantially at an angle of zero degree with respect to the shaft axial direction. Because of errors, for example, in winding, the fiber orientation does not sometimes make an angle of zero degree perfectly with respect to the shaft axial direction. Generally, in the straight layer, an absolute angle θa is equal to or less than 10 degrees.

It is noted that the absolute angle θa means the absolute value of the orientation angle Af. For example, the phrase that the absolute angle θa is equal to or less than 10 degrees means that the angle Af is equal to or greater than −10 degrees and equal to or less than +10 degrees.

In the embodiment in FIG. 2, the straight sheets are the sheet s1, the sheet s4, the sheet s5, the sheet s6, the sheet s7, the sheet s9, the sheet s10, and the sheet s11. The straight layer has high correlations with the flexural rigidity and flexural strength of the shaft.

The bias layer has high correlations with the torsional rigidity and torsional strength of the shaft. The bias sheet preferably includes a pair of two sheets that the fiber orientations are tilted in the opposite directions with each other. From the viewpoint of torsional rigidity, the absolute angle θa of the bias layer is preferably equal to or greater than 15 degrees, more preferably equal to or greater than 25 degrees, and still more preferably equal to or greater than 40 degrees. From the viewpoint of torsional rigidity and flexural rigidity, the absolute angle θa of the bias layer is preferably equal to or less than 60 degrees, and more preferably equal to or less than 50 degrees.

In the shaft 6, the sheets configuring the bias layers are the second sheet s2 and the third sheet s3. As discussed above, in FIG. 2, the angle Af is denoted for the individual sheets. The notations positive (+) and negative (−) of the angle Af express that the fibers in the bias sheets are tilted in the opposite directions with each other. In the present application, the sheet for the bias layer is also simply referred to as a bias sheet. The sheet s2 and the sheet s3 configure the sheet pair.

In FIG. 2, the fiber slope direction of the sheet s3 is equal to the fiber slope direction of the sheet s2. However, as described later, the sheet s3 is reversed, and stacked to the sheet s2. As a result, the slope direction of the sheet s2 and the slope direction of the sheet s3 are in the opposite directions to each other.

It is noted that in the embodiment in FIG. 2, the angle Af in the sheet s2 is −45 degrees and the angle Af in the sheet s3 is +45 degrees. Of course, on the contrary, the angle Af in the sheet s2 may be +45 degrees and the angle Af in the sheet s3 may be −45 degrees.

In the shaft 6, the sheet configuring the hoop layer is the eighth sheet s8. The absolute angle θa in the hoop layer is preferably set substantially at 90 degrees with respect to the shaft axis. However, because of errors, for example, in winding, the fiber orientation does not sometimes make an angle of 90 degrees perfectly with respect to the shaft axial direction. Generally, in the hoop layer, the absolute angle θa is equal to or greater than 80 degrees and equal to or less than 90 degrees. In the present application, the prepreg sheet for the hoop layer is also referred to as a hoop sheet.

The number of layers formed of a single sheet is not limited. For example, if the number of sheet ply is defined as 1, this sheet is wound once in the circumferential direction. If the number of sheet ply is defined as 1, this sheet forms a single layer at all the positions in the circumferential direction of the shaft.

For example, if the number of sheet ply is defined as 2, this sheet is wound twice in the circumferential direction. If the number of sheet ply is defined as 2, this sheet forms two layers at all the positions in the circumferential direction of the shaft.

For example, if the number of sheet ply is defined as 1.5, this sheet is wound 1.5 times in the circumferential direction. If the number of sheet ply is defined as 1.5, this sheet forms a single layer at positions in the circumferential direction at angles of 0 to 180 degrees and forms two layers at positions in the circumferential direction at angles of 180 degrees to 360 degrees.

From the viewpoint of suppressing winding failure such as wrinkles, an excessively wide sheet is not preferable. From this viewpoint, the number of ply for the bias sheet is preferably equal to or less than 4, and more preferably equal to or less than 3. From the viewpoint of the working efficiency of the winding process, the number of ply for the bias sheet is preferably equal to or greater than 1.

From the viewpoint of suppressing winding failure such as wrinkles, an excessively wide sheet is not preferable. From this viewpoint, the number of ply for the straight sheet is preferably equal to or less than 4, more preferably equal to or less than 3, and still more preferably equal to or less than 2. From the viewpoint of the working efficiency of the winding process, the number of ply for the straight sheet is preferably equal to or greater than 1. The number of ply may be 1 in all the straight sheets. The number of ply may be 1 in all the full-length straight sheets.

From the viewpoint of suppressing winding failure such as wrinkles, an excessively wide sheet is not preferable. From this viewpoint, the number of ply for the hoop sheet is preferably equal to or less than 4, more preferably equal to or less than 3, and still more preferably equal to or less than 2. From the viewpoint of the working efficiency of the winding process, the number of ply for the hoop sheet is preferably equal to or greater than 1. The number of ply may be 1 in all the hoop sheets. The number of ply may be 1 in all the full-length hoop sheets.

Although not illustrated in the drawing, the prepreg sheet before used is sandwiched between cover sheets. Generally, the cover sheets include a release paper and a resin film. That is, the prepreg sheet before used is sandwiched between a release paper and a resin film. The release paper is applied to one surface of the prepreg sheet, and the resin film is applied to the other surface of the prepreg sheet. In the following, the surface to which the release paper is applied is also referred to as "a surface on the release paper side", and the surface to which the resin film is applied is also referred to as "a surface on the film side".

The development view of the present application is a diagram that the surface on the film side is the front side. That is, in FIG. 2, the front side of the drawing is the surface on the film side, and the back side of the drawing is the surface on the release paper side. In FIG. 2, lines expressing fiber directions are the same direction in the sheet s2 and the sheet s3, and the sheet s3 is reversed in application described later. As a result, the fiber direction of the sheet s2 and the fiber direction of the sheet s3 are opposite to each other. Therefore, the fiber direction of a layer s2 and the fiber direction of a layer s3 are opposite to each other. In consideration of this point, in FIG. 2, the fiber direction of the sheet s2 is represented as "−45 degrees", and the fiber direction of the sheet s3 is represented as "+45 degrees".

In order to wind the prepreg sheet, first, the resin film is peeled off. The resin film is peeled off, and the surface on the film side is exposed. The exposed surface has tacking property (tackiness). The tacking property is caused by the matrix resin. That is, since the matrix resin is in the semi-cured state, the tackiness is developed. The edge part of the exposed surface on the film side is also referred to as a wind start edge part. Subsequently, the wind start edge part is applied to a wound target. The tackiness of the matrix resin allows smooth application of the wind start edge part. The wound target is a mandrel or a wound body in which the other prepreg sheets are wound around the mandrel. Subsequently, the release paper is peeled off. Subsequently, the wound target is rotated, and the prepreg sheet is wound around the wound target. As described above, the resin film is first peeled off, the wind start end part is then applied to the wound target, and the release paper is then peeled off. That is, the resin film is first peeled off, the wind start edge part is applied to the wound target, and then the release paper is peeled off. With these procedures, wrinkles on the sheet and winding failure of the sheet are suppressed. This is because the sheet, to which the release paper is applied, is supported on the release paper, and is less wrinkled. The release paper has flexural rigidity higher than the flexural rigidity of the resin film.

In the embodiment in FIG. 2, a united sheet is formed. The united sheet is formed by applying two sheets or greater to each other.

In the embodiment in FIG. 2, two united sheets are formed. A first united sheet is formed by stacking the sheet s3 on the sheet s2. A second united sheet is formed by stacking the sheet s8 on the sheet s9. The hoop sheet s8 is wound in the state of a united sheet. This winding method suppresses the winding failure of the hoop sheet. Winding failure means rips on the sheet, errors of the angle Af, wrinkles, or the like.

As described above, in the present application, the sheets and the layers are classified based on the orientation angle of the fiber. Moreover, in the present application, the sheets and the layers are classified based on the length in the shaft axial direction.

In the present application, the layer disposed over the entire length in the shaft axial direction is referred to as a full-length layer. In the present application, the sheet disposed over the entire length in the shaft axial direction is referred to as a full-length sheet. A wound full-length sheet forms a full-length layer.

In the present application, the layer partially disposed in the shaft axial direction is referred to as a partial layer. In the present application, the sheet partially disposed in the shaft axial direction is referred to as a partial sheet. A wound partial sheet forms a partial layer.

In the present application, the full-length layer that is a straight layer is referred to as a full-length straight layer. In the embodiment in FIG. 2, the full-length straight layers are a layer s6, a layer s7, and a layer s9. The full-length straight sheets are the sheet s6, the sheet s7, and the sheet s9.

In the present application, the full-length layer that is a hoop layer is referred to as a full-length hoop layer. In the embodiment in FIG. 2, the full-length hoop layer is a layer s8. The full-length hoop sheet is the sheet s8.

In the present application, the partial layer that is a straight layer is referred to as a partial straight layer. In the embodiment in FIG. 2, the partial straight layers are the layer s1, a layer s4, a layer s5, a layer s10, and a layer s11. The partial straight sheets are the sheet s1, the sheet s4, the sheet s5, the sheet s10, and the sheet s11.

In the present application, the partial layer that is a hoop layer is referred to as a partial hoop layer. The embodiment in FIG. 2 includes no partial hoop layer.

In the present application, the term "butt partial layer" is used. In the embodiment in FIG. 2, the butt partial layer are the layer s4 and the layer s5. The butt partial layer includes a butt straight layer and a butt hoop layer. In the embodiment in FIG. 2, the butt straight layers are the layer s4 and the layer s5. In the embodiment in FIG. 2, the butt hoop layer is not provided. The butt partial layer can contribute to the adjustment of a ratio (Lf1/Lf2). The butt partial layer can contribute to the adjustment of a shaft inertia moment Iss. The butt partial layer can contribute to the adjustment of a shaft inertia moment Is. The butt partial layer can contribute to the adjustment of a club inertia moment Ix. The butt partial layer can contribute to the adjustment of a club inertia moment Ic.

In the present application, the term "tip partial layer" is used. This tip partial layer includes a tip straight layer. In the embodiment in FIG. 2, the tip straight layers are the layer s1, the layer s10, and the layer s11. The tip partial layer improves the strength of the tip end part of the shaft 6. The tip partial layer can contribute to the adjustment of the ratio (Lf1/Lf2).

The tip partial layer can contribute to the adjustment of the club inertia moment Ix. The tip partial layer can contribute to the adjustment of the club inertia moment Ic. The tip partial layer can contribute to the adjustment of the shaft inertia moment Iss. The tip partial layer can contribute to the adjustment of the shaft inertia moment Is.

The shaft 6 is prepared by the sheetwinding method using the plurality of sheets illustrated in FIG. 2.

In the following, the outline of the manufacturing processes of the shaft 6 will be described.

[Outline of the Manufacturing Processes of the Shaft]

(1) Cutting Process

In the cutting process, the prepreg sheet is cut into a desired shape. In this process, the sheets illustrated in FIG. 2 are cut out.

It is noted that the sheet may be cut using a cutter or may be cut manually. In the case of manual cutting, a cutter knife is used, for example.

(2) Stacking Process

In the stacking process, the foregoing two united sheets are prepared.

In the stacking process, heating or pressing may be used. More preferably, heating and pressing are combined. In the winding process described later, the sheets can be deviated in the winding operation of the united sheet. The deviation degrades winding accuracy. Heating and pressing improve the adhesive force between the sheets. Heating and pressing suppress the displacement between the sheets in the winding process.

(3) Winding Process

In the winding process, a mandrel is prepared. A typical mandrel is made of a metal. A mold release agent is applied to the mandrel. Moreover, a resin having tackiness is applied to the mandrel. The resin is also referred to as a tacking resin. The cut sheet is wound around the mandrel. The tacking resin facilitates the application of the sheet end part to the mandrel.

The sheets are wound in order from the sheets located on the upper side in the development view illustrated in FIG. 2. However, the sheets to be stacked are wound in the state of the united sheet.

In the winding process, a wound body can be obtained. The wound body is formed by winding the prepreg sheets on the outer side of the mandrel. Winding is achieved by rolling the wound target on a flat surface, for example. The winding may be made manually or by a machine. This machine is referred to as a rolling machine.

(4) Tape Wrapping Process

In the tape wrapping process, tape is wound around the outer circumferential surface of the wound body. The tape is also referred to as wrapping tape. The tape is wound while tension is applied. A pressure is applied to the wound body by the tape. The pressure decreases voids.

(5) Curing Process

In the curing process, the wound body is heated after tape is wrapped to the wound body. The matrix resin is cured by heating. In the process of curing, the matrix resin is temporarily fluidized. Air between the sheets or air in the sheet can be discharged by the fluidized matrix resin. The pressure (fastening force) of the wrapping tape promotes the discharge of the air. A cured laminate can be obtained by this curing.

(6) Mandrel Extracting Process and Wrapping Tape Removing Process

After the curing process, the mandrel extracting process and the wrapping tape removing process are performed. Although the order of the processes is not limited, from the viewpoint of improving the efficiency of the wrapping tape removing process, the wrapping tape removing process is preferably performed after the mandrel extracting process.

(7) Process of Cutting Both Ends

In this process, the both end parts of the cured laminate are cut. The end face of the tip end Tp and the end face of the butt end Bt are made flat by this cutting.

For easy understanding, the development view illustrated in FIG. 2 illustrates the sheets in the state in which both ends are cut. Practically, in setting the dimensions of the sheets, cutting both ends is considered. That is, practically, the both end parts which are cut in the process of cutting both ends are added.

(8) Polishing Process

In this process, the surface of the cured laminate is polished. The surface of the cured laminate has spiral irregularities left as the trace of wrapping tape. The irregularities as the trace of wrapping tape are eliminated by polishing, and the surface is made smooth.

(9) Coating Process

The cured laminate after the polishing process is coated.

In the processes above, the shaft 6 is obtained. In the shaft 6, the moment Iss is small. In the shaft 6, the ratio (Lf1/Lf2) is great. The shaft 6 is light-weighted.

The sheetwinding method is excellent in the degree of freedom for design. By the method, the moment Iss can be easily adjusted. By the method, the ratio (Iss/Ix) can be easily adjusted. By the method, the ratio (Lf1/Lf2) can be easily adjusted. By the method, the inertia moments Ix, Ic, Is, and the like can be adjusted. Methods for adjusting the moments of inertia include (A1) to (A9) below.

(A1) Increasing or decreasing the winding number of the butt partial layer.
(A2) Increasing or decreasing the thickness of the butt partial layer.
(A3) Increasing or decreasing the length of the butt partial layer in the axial direction.
(A4) Increasing or decreasing the winding number of the tip partial layer.
(A5) Increasing or decreasing the thickness of the tip partial layer.
(A6) Increasing or decreasing the length of the tip partial layer in the axial direction.
(A7) Increasing or decreasing the taper ratio of the shaft.
(A8) Increasing or decreasing the resin content in all the layers.
(A9) Increasing or decreasing the prepreg areal weight of the prepreg in all the layers.

Items for adjusting the shaft flex include (B1) to (B8) below. The frequency of the club can be adjusted by adjusting the shaft flex.

(B1) The elastic modulus of fiber in the straight layer.
(B2) The thickness of the straight layer.
(B3) The winding number of the straight layer.
(B4) The polishing amount in the polishing process.
(B5) The length of the butt partial layer in the axial direction.
(B6) The winding number of the butt partial layer.
(B7) The length of the chip partial layer in the axial direction.
(B8) The winding count of the chip partial layer.

A decrease in the moment Iss can suppress the ratio (Iss/Ix) to be made equal to or less than a predetermined value. From the viewpoint of decreasing Iss, the ratio (Lf1/Lf2) is preferably great. From this viewpoint, the total weight of the butt partial layer (s) with respect to a shaft weight Ws is preferably equal to or greater than 5% by weight, and more preferably equal to or greater than 10% by weight. From the viewpoint of suppressing a hard feeling, the total weight of the butt partial layers with respect to the shaft weight Ws is preferably equal to or less than 50% by weight, and more preferably equal to or less than 45% by weight. In the embodiment in FIG. 2, the total weight of the butt partial layer (s) is the sum total of the weight of the sheet s4 and the sheet s5.

In the present application, a specific butt range is defined. The specific butt range is a range from a point 250 mm apart from the butt end Bt in the axial direction to the butt end Bt. The weight of the butt partial layer in the specific butt range is defined as Wa, and the weight of the shaft in the specific butt range is defined as Wb. From the viewpoint of increasing the ratio (Lf1/Lf2), the ratio (Wa/Wb) is preferably equal to or greater than 0.4, more preferably equal to or greater than 0.42, still more preferably equal to or greater than 0.43, and still yet more preferably equal to or greater than 0.44. From the viewpoint of suppressing a hard feeling, the ratio (Wa/Wb) is preferably equal to or less than 0.7, more preferably equal to or less than 0.65, and still more preferably equal to or less than 0.6.

In the present application, the club weight is defined as Wc (kg), the head weight is defined as Wh (kg), the shaft weight is defined as Ws (kg), and the grip weight is defined as Wg (kg).

In the embodiment, the following moments of inertia are considered. These moments of inertia are the moments of inertia about a swing axis Zx. These moments of inertia can be correlated with an easy swing. The unit of these moments of inertia is "kg·cm$^2$"
(a) Club inertia moment Ix
(b) Shaft inertia moment Iss
(c) Grip inertia moment Igs
(d) Head inertia moment Ihs In order to calculate the moments of inertia using the parallel axis theorem, the following moments of inertia are used.
(e) Club inertia moment Ic
(f) Shaft inertia moment Is
(g) Grip inertia moment Ig
(h) Head inertia moment Ih The following is the detail of the moments of inertia (a) to (d).

[Club Inertia Moment Ix]

Ix is the moment of inertia of the club 2. Ix is the moment of inertia about the swing axis Zx.

Figure 3:
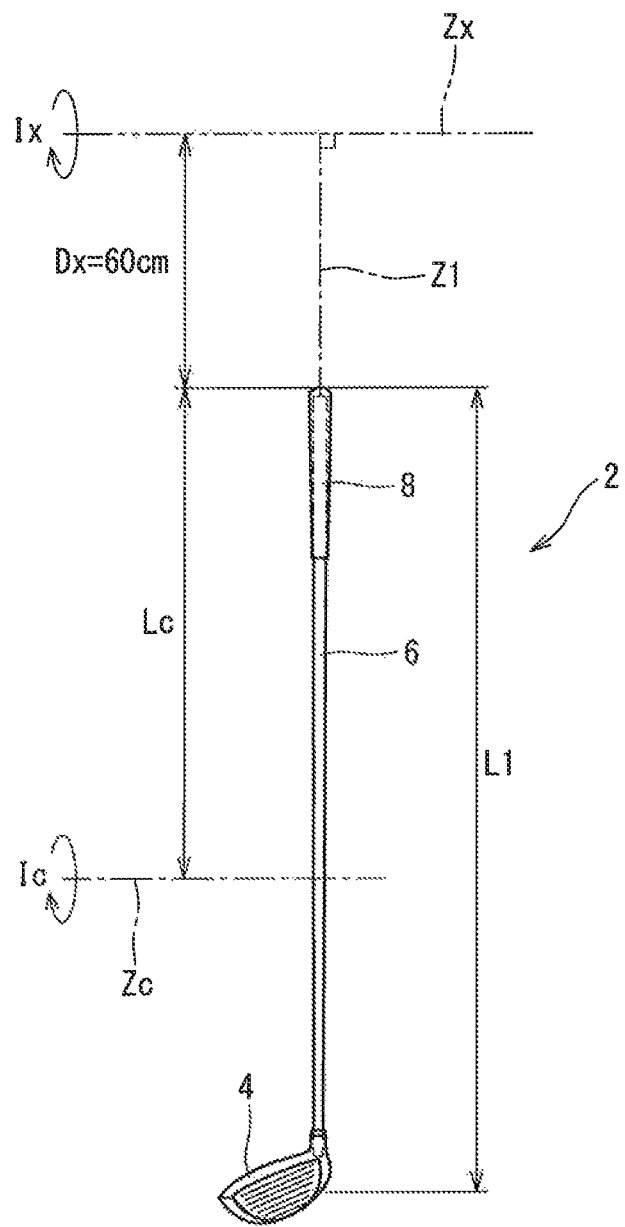
FIG. 3 is an illustration of a moment of inertia of the club about a swing axis.

FIG. 3 is a conceptual diagram for explaining the club inertia moment Ix.

As illustrated in FIG. 3, a distance Lc is an axial direction distance from the grip end to the center of gravity of the club. The inertia moment Ic is the moment of inertia of the club 2, and the moment of inertia about an axis Zc. As illustrated in FIG. 3, the axis Zc is in parallel with the swing axis Zx. The axis Zc is passed through the center of gravity of the club.

The inertia moment Ix (kg·cm$^2$) is calculated by Equation (1) below. Equation (1) is based on the parallel axis theorem.

$$Ix = Wc \times (Lc+60)^2 + Ic \quad (1)$$

As illustrated in FIG. 3, the swing axis Zx is set at a position at which a distance Dx from the grip end is 60 cm. The swing axis Zx is perpendicular to a shaft axis Z1. The position of the swing axis Zx will be described later.

[Shaft Inertia Moment Iss]

Iss is the moment of inertia of the shaft 6. Iss is the moment of inertia about the swing axis Zx.

Figure 4:
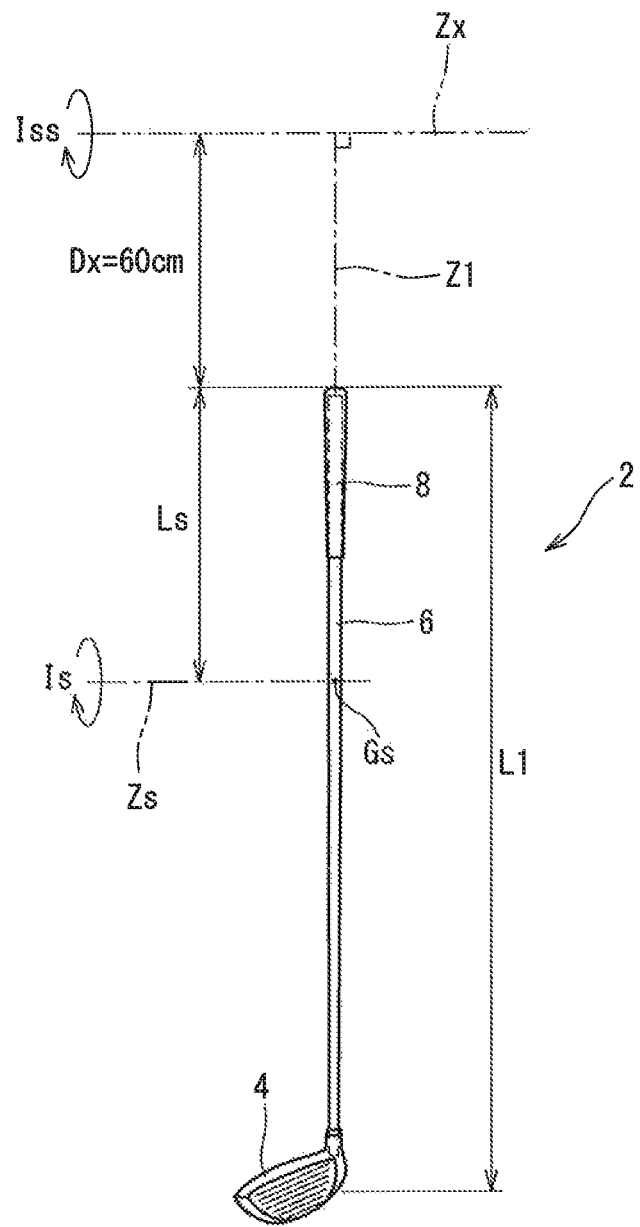
FIG. 4 is an illustration of a moment of inertia of the shaft about the swing axis.

FIG. 4 is a conceptual diagram for explaining the shaft inertia moment Iss. Although the club 2 is illustrated in FIG. 4, only the shaft 6 is targeted in the calculation of the inertia moment Iss.

As illustrated in FIG. 4, a distance Ls is an axial direction distance from the grip end to the shaft gravity center Gs. The inertia moment Is is the moment of inertia of the shaft 6, and the moment of inertia about an axis Zs. The inertia moment Is is the moment of inertia of the shaft 6 alone. As illustrated in FIG. 4, the axis Zs is in parallel with the swing axis Zx. The axis Zs is passed through the shaft gravity center Gs. The axis Zs is perpendicular to the shaft axis Z1.

The inertia moment Iss (kg·cm$^2$) is calculated by Equation (2) below. Equation (2) is based on the parallel axis theorem.

$$Iss = Ws \times (Ls+60)^2 + Is \quad (2)$$

The inertia moment Iss is a part of the club inertia moment Ix. In the club inertia moment Ix, a part caused by the shaft 6 is the inertia moment Iss.

[Grip Inertia Moment Igs]

Igs is the moment of inertia of the grip 8. Igs is the moment of inertia about the swing axis Zx.

Figure 5:
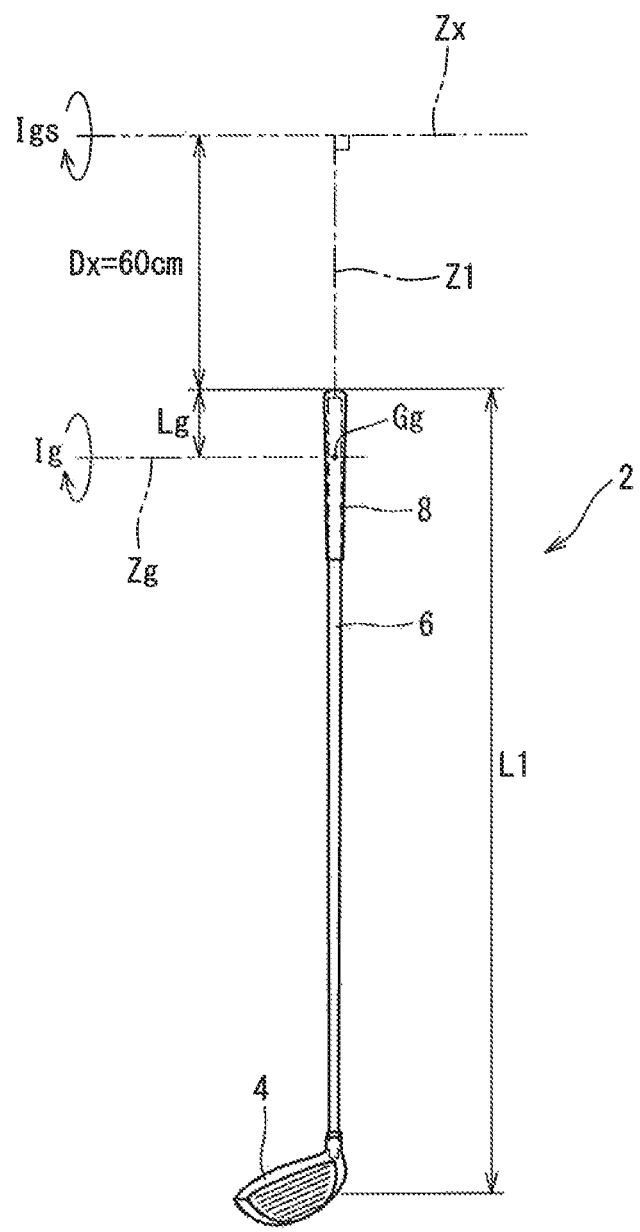
FIG. 5 is an illustration of a moment of inertia of a grip about the swing axis.

FIG. 5 is a conceptual diagram for explaining the grip inertia moment Igs. Although the club 2 is illustrated in FIG. 5, only the grip 8 is targeted in the calculation of the inertia moment Igs.

As illustrated in FIG. 5, a distance Lg is an axial direction distance from the grip end to a grip gravity center Gg. The inertia moment Ig is the moment of inertia of the grip 8, and the moment of inertia about an axis Zg. The inertia moment Ig is the moment of inertia of the grip 8 alone. As illustrated in FIG. 5, the axis Zg is in parallel with the swing axis Zx. The axis Zg is passed through the grip gravity center Gg. The axis Zg is perpendicular to the center line (not illustrated) of the grip 8. The center line of the grip 8 is matched with the shaft axis Z1. The axis Zg is perpendicular to the shaft axis Z1.

The inertia moment Igs (kg·cm$^2$) is calculated by Equation (3) below. Equation (3) is based on the parallel axis theorem.

$$Igs = Wg \times (Lg+60)^2 + Ig \quad (3)$$

The inertia moment Igs is a part of the club inertia moment Ix. In the club inertia moment Ix, a part caused by the grip 8 is the inertia moment Igs.

[Head Inertia Moment Ihs]

Ihs is a moment of inertia of the head 4 (a head inertia moment). Ihs is the moment of inertia about the swing axis Zx.

Figure 6:
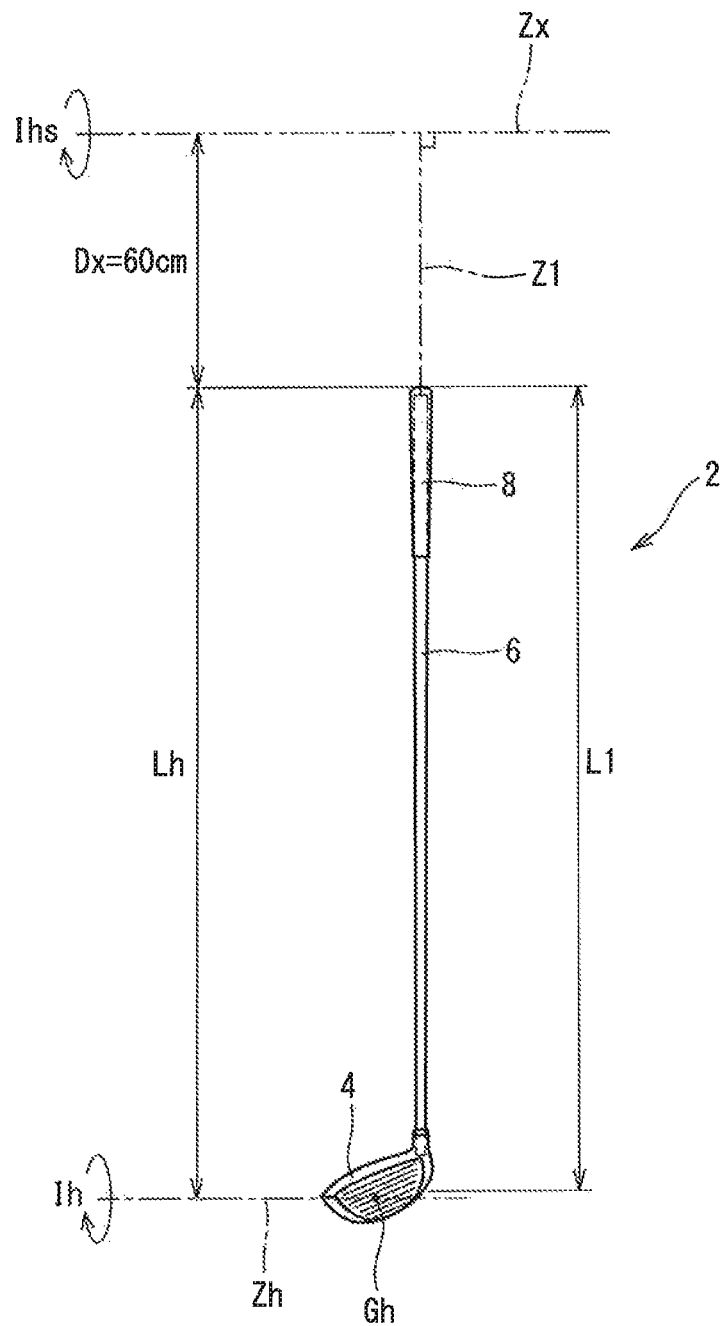
FIG. 6 is an illustration of a moment of inertia of a head about the swing axis.

FIG. 6 is a conceptual diagram for explaining the head inertia moment Ihs. Although the club 2 is illustrated in FIG. 6, only the head 4 is targeted in the calculation of the inertia moment Ihs.

As illustrated in FIG. 6, a distance Lh is an axial direction distance from the grip end to a head gravity center Gh. The inertia moment Ih is the moment of inertia of the head 4, and the moment of inertia about an axis Zh. The inertia moment Ih is the moment of inertia of the head 4 alone. As illustrated in FIG. 6, the axis Zh is in parallel with the swing axis Zx. The axis Zh is passed through the head gravity center Gh. The axis Zh is perpendicular to the center line (not illustrated) of the hosel hole of the head 4. The center line of the hosel hole of the head 4 is matched with the shaft axis Z1. The axis Zh is perpendicular to the shaft axis Z1.

The inertia moment Ihs (kg·cm$^2$) is calculated by Equation (4) below. Equation (4) is based on the parallel axis theorem.

$$Ihs = Wh \times (Lh+60)^2 + Ih \quad (4)$$

The inertia moment Ihs is a part of the club inertia moment Ix. In the club inertia moment Ix, a part caused by the head 4 is the inertia moment Ihs.

In the present application, a reference state (not illustrated) is defined. The reference state is a state in which the sole of the club 2 is placed on a horizontal plane at a specified lie angle and a real loft angle. In the reference state, the shaft axis Z1 is included in a plane VP1 perpendicular to the horizontal plane. The plane VP1 is defined as a reference vertical plane. The specified lie angle and real loft angle are described on product catalogs, for example. As apparent from FIGS. 3 to 6, in the measurement of the moments of inertia, the face plane is in a substantially square state with respect to the head path. The orientation of the face plane is in the state of an ideal impact. The swing axis Zx is included in the reference vertical plane. That is, in the measurement of the inertia moments Ix, Iss, Igs, and Ihs, the swing axis Zx is included in the reference vertical plane. In the measurement of the inertia moment Ic, the axis Zc is included in the reference vertical plane. In the measurement of the inertia moment Is, the axis Zs is included in the reference vertical plane. In the measurement of the inertia moment Ig, the axis Zg is included in the reference vertical plane. In the measurement of the inertia moment Ih, the axis Zh is in parallel with the reference vertical plane. Generally, the head gravity center Gh is apart from the reference vertical plane. In this case, the axis Zh is not included in the reference vertical plane. The foregoing moments of inertia reflect the attitude of the club near an impact. The foregoing moments of inertia reflect swings. Therefore, these moments of inertia have a high correlation with the ease of a swing.

It is assumed that the center of gravity of the club is located on the shaft axis Z1. Because of the position of the head gravity center Gh, the real center of gravity of the club is slightly displaced from the shaft axis Z1. The real center of gravity of the club can be located in a space, for example. In the present application, it is assumed that a point on the axis Z1 closest to the real center of gravity of the club is the center of gravity of the club. In other words, the center of gravity of the club in the present application is an intersection point between the axis Z1 and a perpendicular line from the real center of gravity of the club to the axis Z1. The approximation of the position of the center of gravity of the club can give a slight difference to the value of the inertia moment Ix. However, the difference is small to the extent that the difference does not affect the effects described in the present application.

In the embodiment, the head gravity center Gh is apart from the reference vertical plane, and the axis Zh is also apart from the reference vertical plane. Therefore, the head inertia moment Ihs can be an approximate value. However, the difference caused by the approximation is small to the extent that the difference does not affect the effects described in the present application.

It is assumed that the grip gravity center Gg is located on the shaft axis Z1. The real center of gravity of the grip is generally located on the shaft axis Z1. However, the real center of gravity of the grip is sometimes displaced from the axis Z1. Also in this case, in the present application, it is also assumed that the grip gravity center Gg is located on the axis Z1. A point on the axis Z1 closest to the real center of gravity of the grip is the grip gravity center Gg. The approximation of the position of the center of gravity of the grip can give a slight difference to the value of the inertia moment Igs. However, the difference is small to the extent that the difference does not affect the effects described in the present application.

Conventionally, a swing balance (a club balance) is known as an index of the ease of a swing. However, the swing balance is a static moment, and not a dynamic index. On the other hand, a swing is dynamic. For the dynamic index of the ease of a swing, the inertia moment Ix about the swing axis has been found by the inventor.

Moreover, it is also effective to introduce dynamic indexes for the members of the club in consideration of swings. The moment of inertia about the swing axis is also taken into account for the shaft 6. Since the shaft is long in the axial direction, the influence applied to the moments of inertia is great. From the viewpoint of reflecting the actual conditions of a swing, the inertia moment Iss that is a dynamic index is considered for the shaft 6. More preferably, the inertia moment Igs that is a dynamic index is considered for the grip 8. More preferably, the inertia moment Ihs that is a dynamic index is taken into account for the head 4.

In actual swings, the golf club is not rotated about the grip end. The golf club is rotated about the body of a golf player together with the arms of the golf player. In the present application, the swing axis is set in consideration of the position of the body of the golf player when taking a swing.

The swing axis is apart from the grip end. In order to evaluate the ease of a dynamic swing, a spacing distance Dx between the swing axis and the grip end was set (see FIG. 3). As for the spacing distance Dx, many golf players' figures and swings have been analyzed. For the golf players' figure, for example, the arm length has been considered. As a result, it has been revealed that the spacing distance Dx is preferably about 60 cm. In consideration of the actual conditions of such swings, in Equation (1) above, the value [Lc+60] is used. Similarly, in Equation (2) above, the value [Ls+60] is used. Similarly, in Equation (3) above, the value [Lg+60] is used. Similarly, in Equation (4) above, the value [Lh+60] is used.

A swing is dynamic. As compared with the static index, the dynamic index tends to reflect the ease of a swing. As described above, the inertia moment Ix takes account of the actual conditions of swings. Therefore, the inertia moment Ix accurately reflects the ease of a swing.

From the viewpoint of the ease of a swing for advanced golf players whose head speed is relatively fast, the inertia moment Ix is preferably relatively great.

From the viewpoint of the ease of a swing for advanced golf players, the inertia moment Ix is preferably equal to or greater than $6.90 \times 10^3$ (kg·cm$^2$), more preferably equal to or greater than $7.00 \times 10^3$ (kg·cm$^2$), and still more preferably equal to or greater than $7.05 \times 10^3$ (kg·cm$^2$). An excessively large inertia moment Ix can decrease the head speed. From this viewpoint, the inertia moment Ix is preferably equal to or less than $7.50 \times 10^3$ (kg·cm$^2$), more preferably equal to or less than $7.45 \times 10^3$ (kg·cm$^2$), still more preferably equal to or less than $7.40 \times 10^3$ (kg·cm$^2$), and yet still more preferably equal to or less than $7.35 \times 10^3$ (kg·cm$^2$).

The inertia moment Ix is appropriately set, so that the ease of a swing can be improved. The ease of a swing can contribute to the improvement of the head speed. For a method for making the inertia moment Ix equal to or less than a predetermined value, it is considered to decrease the head weight Wh. However, when the head weight Wh is simply decreased, the kinetic energy of the head is reduced. In this case, the coefficient of restitution and the initial velocity of the ball are decreased.

Moreover, preferably, the frequency of the club is taken into account. The frequency of the club can affect the ease of a swing. More specifically, the influence of the frequency of the club is great for advanced golf players whose head speed is relatively fast. Both of the inertia moment Ix and the frequency of the club are dynamic indexes. The ease of a swing can be improved by taking the frequency of the club into account in addition to the inertia moment Ix.

The frequency of the club is taken into account, so that the ease of a swing can be improved. In the case where the ratio Iss/Ix is small, the flexure of the shaft is apt to be excessively great. This excessively great flexure can cause the behavior of the shaft to be unstable in taking a swing. When an advanced golf player whose head speed is relatively fast takes a swing, the behavior of shaft is apt to be unstable. The frequency of the club is taken into account, so that the behavior of the shaft becomes stable, and the ease of a swing can be improved. From this viewpoint, the frequency of the club is preferably equal to or greater than 240 (cpm), more preferably equal to or greater than 245 (cpm), and still more preferably equal to or greater than 250 (cpm). If the flexure is excessively small, the head speed and the ease of a swing are apt to decrease. From this viewpoint, the frequency of the club is preferably equal to or less than 290 (cpm), preferably equal to or less than 280 (cpm), and still more preferably equal to or less than 275 (cpm). The frequency of the club can be adjusted by the shaft flex, the rigidity distribution of the shaft, the hardness of the grip, the head weight Wh, or the like.

Moreover, it is effective to take account of the ratio Iss/Ix. It is preferable to set the inertia moment Ix and the ratio Iss/Ix in predetermined ranges. Preferably, the inertia moment Ix is set in a predetermined range, and then the ratio Iss/Ix is moderately suppressed. In this case, the ease of a swing and the flight distance can be improved.

The shaft weight Ws has little contribution to the rebound performance. However, a weight reduction in the shaft has a limitation. The ratio Iss/Ix that is a dynamic index is taken into account, so that the weight distribution of the shaft can be dynamically optimized. Therefore, from a dynamic viewpoint, the weight distribution of the entire club 2 can be optimized. The weight distribution provides both of the ease of a swing and the rebound performance.

From the viewpoint of the ease of a swing for advanced golf players, the ratio Iss/Ix is preferably equal to or less than 0.115, more preferably equal to or less than 0.113, and still more preferably equal to or less than 0.112. From the viewpoint of the ease of a swing for advanced golf players and the practical strength of the shaft, the ratio Iss/Ix is preferably equal to or greater than 0.085, more preferably equal to or greater than 0.087, still more preferably equal to or greater than 0.090, and yet more preferably equal to or greater than 0.095.

Preferably, the shaft inertia moment Iss about the swing axis is considered. The inertia moment Iss is based on the swing axis Zx. Therefore, the inertia moment Iss is a value considering the actual conditions of a swing. In the design of a club considering the ease of a swing, the inertia moment Iss can be an effective index.

The inertial moment Iss is suppressed, so that the degree of contribution of the shaft can be decreased in the inertial moment Ix. A moderately suppressed inertia moment Iss can moderately suppress the ratio Iss/Ix. From the viewpoint of the ease of a swing, the inertia moment Iss is preferably equal to or less than 900 (kg·cm$^2$), more preferably equal to or less than 880 (kg·cm$^2$), and still more preferably equal to or less than 860 (kg·cm$^2$). In consideration of the practical strength of the shaft and the fitness for advanced golf players, the inertia moment Iss is preferably equal to or greater than 700 (kg·cm$^2$), more preferably equal to or greater than 720 (kg·cm$^2$), and still more preferably equal to or greater than 740 (kg·cm$^2$).

Preferably, the grip inertia moment Igs about the swing axis is considered. The inertia moment Igs is based on the swing axis Zx. Therefore, the inertia moment Igs is a value considering the condition of a swing. In the design of a club considering the ease of a swing, the inertia moment Igs can be an effective index.

The inertia moment Igs is suppressed, so that the degree of contribution of the grip can be decreased in the inertia moment Ix. The weight of the grip 8 has little contribution to the rebound performance. However, a weight reduction in the grip 8 has a limitation. In consideration of Igs that is a dynamic index, the weight distribution of the entire club 2 can be optimized from a dynamic viewpoint. The weight distribution provides both of the ease of a swing and the rebound performance.

From the viewpoint of the ease of a swing for advanced golf players and the flight distance, the inertia moment Igs is preferably equal to or less than 280 (kg·cm$^2$), more preferably equal to or less than 260 (kg·cm$^2$), and still more preferably equal to or less than 240 (kg·cm$^2$). In consideration of the durability of the grip, an excessively small inertia moment Igs is not preferable. From this viewpoint, the inertia moment Igs is preferably equal to or greater than 80 (kg·cm$^2$), more preferably equal to or greater than 90 (kg·cm$^2$), and still more preferably equal to or greater than 100 (kg·cm$^2$).

From the viewpoint of increasing the kinetic energy transmitted to a ball, the ratio (Ihs/Ix) is preferably equal to or greater than 0.85, more preferably equal to or greater than 0.86, and still more preferably equal to or greater than 0.87. In consideration of the limitation of the club design, the ratio (Ihs/Ix) is preferably equal to or less than 0.93, and more preferably equal to or less than 0.92.

From the viewpoint of increasing the kinetic energy of the head, the inertia moment Ihs is preferably equal to or greater than $5.60 \times 10^3$ (kg·cm$^2$), more preferably equal to or greater than $5.70 \times 10^3$ (kg·cm$^2$), and still more preferably equal to or greater than $5.80 \times 10^3$ (kg·cm$^2$). From the viewpoint of the ease of a swing, the inertia moment Ihs is preferably equal to or less than $6.90 \times 10^3$ (kg·cm$^2$), more preferably equal to or less than $6.80 \times 10^3$ (kg·cm$^2$), still more preferably equal to or less than $6.70 \times 10^3$ (kg·cm$^2$), yet more preferably equal to or less than $6.60 \times 10^3$ (kg·cm$^2$), and still yet more preferably equal to or less than $6.50 \times 10^3$ (kg·cm$^2$).

For the index of the ease of a swing, the club balance is generally used. The club balance is a static moment in which a point 14 inches apart from the grip end is a fulcrum. The club balance can be suppressed by decreasing the weight of the shaft. However, a weight reduction in the shaft has a limitation as described above.

In contrast to this, in the embodiment, attention is focused on a technical idea different from conventional ones. In the embodiment, the moment Ix and the ratio (Iss/Ix) are considered. The inertia moment Iss is the moment of inertia of the shaft alone, but the rotation axis is the swing axis Zx. In addition to this, as illustrated in FIG. 4, the attitude of the shaft 6 in the calculation of the inertia moment Iss is similar to the attitude when taking a swing. Therefore, the moment Iss reflects the actual conditions of a swing. The moment Iss accurately reflects the ease of a swing. In the embodiment, the ratio (Iss/Ix) is taken into account, not simply taking account of the shaft weight Ws. Thus, the ease of a swing is dynamically evaluated. Therefore, the weight distribution of the club 2 can be optimized.

More preferably, the inertia moment Igs is taken into account. The inertia moment Igs is the moment of inertia of the grip alone, but the rotation axis thereof is the swing axis Zx. Moreover, as illustrated in FIG. 5, the attitude of the grip 8 in the calculation of the inertia moment Igs is similar to the attitude of the grip 8 in a swing. The inertia moment Igs accurately reflects the influence of the grip 8 on the ease of a swing. In the embodiment, the inertia moment Igs is taken into account, not simply taking account of the grip weight Wg. Thus, the ease of a swing is dynamically evaluated.

The static moment of the club is defined as Mt. The static moment Mt is calculated by Equation (5) below. The unit of the static moment Mt is kg·cm.

$$Mt = Wc \times (Lc - 35.6) \tag{5}$$

The static moment Mt corresponds to a 14-inch swing balance. The swing balance is a symbolized value of the static moment Mt.

Preferably, the inertia moment Ix is small with respect to the static moment Mt. In other words, preferably, the ratio (Ix/Mt) is small. In other words, preferably, the inertia moment Ix is small and the static moment Mt is great. With this configuration, the inertia moment Ix can be made smaller while the center of gravity of the club is located close to the head. Therefore, it is possible to decrease the inertia moment Ix while increasing the ratio (Ihs/Ix).

A decrease in the ratio Ix/Mt means that the inertia moment Ix is small while the static moment Mt is relatively great. In other words, this means that the inertia moment Ix is small while the club balance is relatively great. Therefore, a decrease in the ratio Ix/Mt means that a swing is easily taken despite a heavy club balance. As described above, conventionally, the index of the ease of a swing is defined as the club balance. Conventionally, a technical idea is known that a swing is not easily taken if the club balance is great (technical idea X). Based on this technical idea X, it was not enabled to assume a concept that a swing is easily taken despite a heavy club balance. Therefore, conventionally, it was difficult to conceive a technical idea that the ratio Ix/Mt is decreased.

In the case where the ratio Ix/Mt is small, a swing is easily taken regardless that the static moment Mt is great. The ease of a swing can contribute to the enhancement of the flight distance performance. From this viewpoint, the ratio Ix/Mt is preferably equal to or less than 442, more preferably equal to or less than 441, still more preferably equal to or less than 440, and yet more preferably equal to or less than 437. In consideration of the strength of the head, the shaft, and the grip, there is a limitation to decrease in the inertia moment Ix. In consideration of this point, the ratio Ix/Mt is preferably equal to or greater than 415, more preferably equal to or greater than 420, still more preferably equal to or greater than 425, and yet more preferably equal to or greater than 428.

From the viewpoint of the ease of a swing for advanced golf players, the static moment Mt is preferably equal to or greater than 16.3 kg·cm, more preferably equal to or greater than 16.4 kg·cm, and still more preferably equal to or greater than 16.7 kg·cm. In the case where the club length L1 or the like is set to a preferred value, the static moment Mt is preferably equal to or less than 18.0 kg·cm, more preferably equal to or less than 17.5 kg·cm, still more preferably equal to or less than 17.1 kg·cm, and yet more preferably equal to or less than 17.0 kg·cm.

[Shaft Weight Ws]

From the viewpoint of the strength and durability of the shaft, the shaft weight Ws is preferably equal to or greater than 40 g (0.040 kg), more preferably equal to or greater than 43 g (0.043 kg), and still more preferably equal to or greater than 45 g (0.045 kg). From the viewpoint of the ease of a swing for advanced golf players, the shaft weight Ws is preferably equal to or less than 80 g (0.080 kg), more preferably equal to or less than 75 g (0.075 kg), and still more preferably equal to or less than 72 g (0.072 kg).

[Grip Weight Wg]

From the viewpoint of the strength and durability of the grip, the grip weight Wg is preferably equal to or greater than 15 g (0.015 kg), more preferably equal to or greater than 18 g (0.018 kg), and still more preferably equal to or greater than 20 g (0.020 kg). From the viewpoint of the ease of a swing for advanced golf players, the grip weight is preferably equal to or less than 60 g (0.060 kg), more preferably equal to or less than 58 g (0.058 kg), and still more preferably equal to or less than 55 g (0.055 kg). The grip weight Wg can be adjusted by the volume of the grip, the specific gravity of rubber, the use of expanded rubber, or the like. The grip weight Wg may be adjusted by combining expanded rubber with unexpanded rubber.

[Head Weight Wh]

The kinetic energy of the head is increased, so that the initial velocity of a ball can be improved in hitting the ball. From this viewpoint, the head weight Wh is preferably equal to or greater than 185 g (0.185 kg), more preferably equal to or greater than 190 g (0.190 kg), and still more preferably equal to or greater than 195 g (0.195 kg). From the viewpoint of the ease of a swing, the head weight Wh is preferably equal to or less than 260 g (0.260 kg), more preferably equal to or less than 250 g (0.250 kg), and still more preferably equal to or less than 245 g (0.245 kg).

[Shaft Length Lf2]

From the viewpoint of improving the head speed by increasing the rotation radius of a swing, the shaft length Lf2 is preferably equal to or greater than 99 cm, more preferably equal to or greater than 105 cm, still more preferably equal to or greater than 107 cm, and yet more preferably equal to or greater than 110 cm. From the viewpoint of suppressing variation in points to hit, the shaft length Lf2 is preferably equal to or less than 120 cm, more preferably equal to or less than 118 cm, and still more preferably equal to or less than 116 cm.

[Distance Lf1]

The shaft gravity center Gs comes close to the butt end Bt, and the ratio Iss/Ix can be decreased. From this viewpoint, the distance Lf1 (see FIG. 1) is preferably equal to or greater than 540 mm, more preferably equal to or greater than 550 mm, and still more preferably equal to or greater than 560 mm. In the case where the distance Lf1 is excessively great, the weight that can be distributed to the tip end part of the shaft becomes small, and the strength of the tip end part of the shaft is apt to decrease. From this viewpoint, the distance Lf1 is preferably equal to or less than 750 mm, more preferably equal to or less than 745 mm, and still more preferably equal to or less than 740 mm.

[Lf1/Lf2]

From the viewpoint of suppressing Ix, the ratio Lf1/Lf2 is preferably equal to or greater than 0.55, more preferably equal to or greater than 0.56, and still more preferably equal to or greater than 0.57. From the viewpoint of improving the strength of the tip end part of the shaft, the ratio Lf1/Lf2 is preferably equal to or less than 0.67, more preferably equal to or less than 0.66, and still more preferably equal to or less than 0.65.

[Club Length L1]

From the viewpoint of improving the head speed, the club length L1 is preferably equal to or greater than 43 inches, more preferably equal to or greater than 44 inches, still more preferably equal to or greater than 45 inches, yet more preferably equal to or greater than 45.2 inches, and still yet more preferably equal to or greater than 45.3 inches. From the viewpoint of suppressing variation in points to hit, the club length L1 is preferably equal to or less than 48 inches, more preferably equal to or less than 47.5 inches, still more preferably equal to or less than 47 inches.

The club length L1 in the present application is measured based on the golf rule of "1c. Length" in "1. Clubs" of "Appendix II. Design of Clubs", defined by R&A (Royal and Ancient Golf Club of Saint Andrews).

It is noted that it is a driver that the flight distance performance is more particularly emphasized. From this viewpoint, the club 2 is preferably a driver. From the viewpoint of the flight distance performance, the real loft is preferably equal to or greater than 7 degrees, and the real loft is preferably equal to or less than 13 degrees. From the viewpoint of improving the inertia moment Ih, the volume of the head is preferably equal to or greater than 350 cc, more preferably equal to or greater than 380 cc, still more preferably equal to or greater than 400 cc, and yet more preferably equal to or greater than 420 cc. From the viewpoint of the strength of the head, the volume of the head is preferably equal to or less than 470 cc.

[Club Weight Wc]

From the viewpoint of improving the inertia moment Ix, the club weight Wc is preferably equal to or less than 320 g (0.320 kg), more preferably equal to or less than 315 g (0.315 kg), still more preferably equal to or less than 310 g (0.310 kg), yet more preferably equal to or less than 300 g (0.300 kg), and still yet more preferably equal to or less than 293 g (0.293 kg). From the viewpoint of the strength of the shaft and the head, the club weight is preferably equal to or greater than 250 g (0.250 kg), more preferably equal to or greater than 260 g (0.260 kg), and still more preferably equal to or greater than 270 g (0.270 kg).

EXAMPLES

In the following, the effects of the present invention will be clarified by examples. However, the present invention should not be interpreted in a limited way based on the description of the examples.

Table 1 shows examples of prepregs usable for the shaft according to the present invention.

TABLE 1

Examples of Usable Prepregs

| Manufacturer | Prepreg Sheet Product Number | Sheet Thickness (mm) | Fiber Content (% by mass) | Resin Content (% by mass) | Carbon Fiber Product Number | Carbon Fiber Physical Property Value | |
|---|---|---|---|---|---|---|---|
| | | | | | | Tensile elastic modulus (t/mm$^2$) | Tensile Strength (kgf/mm$^2$) |
| Toray Industries, Inc. | 3255S-10 | 0.082 | 76 | 24 | T700S | 23.5 | 500 |
| Toray Industries, Inc. | 3255S-12 | 0.103 | 76 | 24 | T700S | 23.5 | 500 |
| Toray Industries, Inc. | 3255S-15 | 0.123 | 76 | 24 | T700S | 23.5 | 500 |
| Toray Industries, Inc. | 805S-3 | 0.034 | 60 | 40 | M30S | 30 | 560 |
| Toray Industries, Inc. | 2255S-10 | 0.082 | 76 | 24 | T800S | 30 | 600 |
| Toray Industries, Inc. | 2255S-12 | 0.102 | 76 | 24 | T800S | 30 | 600 |
| Toray Industries, Inc. | 2255S-15 | 0.123 | 76 | 24 | T800S | 30 | 600 |
| Toray Industries, Inc. | 2256S-10 | 0.077 | 80 | 20 | T800S | 30 | 600 |
| Toray Industries, Inc. | 2256S-12 | 0.103 | 80 | 20 | T800S | 30 | 600 |
| Nippon Graphite Fiber Corporation | E1026A-09N | 0.100 | 63 | 37 | XN-10 | 10 | 190 |
| Mitsubishi Rayon Co., Ltd | TR350C-100S | 0.083 | 75 | 25 | TR50S | 24 | 500 |
| Mitsubishi Rayon Co., Ltd | TR350C-125S | 0.104 | 75 | 25 | TR50S | 24 | 500 |
| Mitsubishi Rayon Co., Ltd | TR350C-150S | 0.124 | 75 | 25 | TR50S | 24 | 500 |
| Mitsubishi Rayon Co., Ltd | MR350C-075S | 0.063 | 75 | 25 | MR40 | 30 | 450 |
| Mitsubishi Rayon Co., Ltd | MR350C-100S | 0.085 | 75 | 25 | MR40 | 30 | 450 |
| Mitsubishi Rayon Co., Ltd | MR350C-125S | 0.105 | 75 | 25 | MR40 | 30 | 450 |
| Mitsubishi Rayon Co., Ltd | MR350E-100S | 0.093 | 70 | 30 | MR40 | 30 | 450 |
| Mitsubishi Rayon Co., Ltd | HRX350C-075S | 0.057 | 75 | 25 | HR40 | 40 | 450 |
| Mitsubishi Rayon Co., Ltd | HRX350C-110S | 0.082 | 75 | 25 | HR40 | 40 | 450 |

The tensile strength and the tensile elastic modulus are measured in accordance with "Testing Method for Carbon Fibers" JIS R7601:1986.

Example 1

A shaft having a laminate configuration the same as the configuration of the shaft 6 was prepared. That is, a shaft having the configuration of the sheets illustrated in FIG. 2 was prepared. A manufacturing method was the same as the method for the shaft 6.

An appropriate prepreg was selected from the prepregs shown in Table 1, and the shaft according to example 1 was prepared. The prepreg "HRX350C-110S" was used for the bias layer. The prepreg whose tensile elastic modulus was 23.5 to 30 (t/mm$^2$) was used for the straight layer. These prepregs are shown in Table 1. Prepregs were selected so as to have desired values for the frequency of the club, the inertia moment Ix, the ratio Iss/Ix, the ratio Lf1/Lf2, the shaft weight, or the like. The shaft according to example 1 was obtained by the manufacturing method described above.

The obtained shaft was attached with a commercially available driver head (SRIXON 2725 made by DUNLOP SPORTS CO. LTD.: a loft angle of 9.5 degrees) and a grip, and a golf club according to example 1 was obtained. Table 2 shows the specifications and evaluation result of example 1.

Examples 2 to 11 and Comparative Examples 1 to 12

Shafts and heads according to examples and comparative examples were obtained in the same way as example 1 except the specifications shown in Tables 2 to 8 below.

In these examples and comparative examples, the head weight Wh was adjusted by polishing the overall outer surface of the head and using a weight adjustment adhesive. The adhesive was applied to the inner surface of the head. The adhesive is a thermoplastic adhesive, fixed to a predetermined position on the inner surface of the head at room temperature, and flows at high temperature. While the temperature of the adhesive was set at high temperature, the adhesive was poured into the head, and then cooled at ambient temperature for fixing. The adhesive was disposed so as not to change the position of the center of gravity of the head.

In the examples and comparative examples, the grip weight Wg was adjusted by the material of the grip. Expanded rubber was used for grips having a small weight Wg.

The shaft flex, the inertia moment Iss, the ratio Lf1/Lf2, or the like were adjusted based on the foregoing items (A1) to (A9) and (B1) to (B8). The specifications of the examples and the comparative examples were obtained using these adjustments. The specifications of the examples and comparative examples are shown in Tables 2 to 8 below. It is noted that in Tables, example 1 is described at a plurality of places for easy comparison of data.

TABLE 2

Specifications and Evaluation Results of Examples and Comparative Examples

|  | Comparative Example 1 | Example 1 | Example 2 | Comparative Example 2 |
|---|---|---|---|---|
| Club Weight Wc (g) | 281.0 | 291.0 | 296.0 | 301.0 |
| Club Length L1 (inch) | 45 | 45 | 45 | 45 |
| Inertia Moment Ix about Swing Axis (kg·cm$^2$) | 7000 | 7300 | 7450 | 7600 |
| Head Weight Wh (g) | 195 | 205 | 210 | 215 |
| Head Inertia Moment Ihs (kg·cm$^2$) | 6000 | 6300 | 6450 | 6600 |
| Ihs/Ix | 0.86 | 0.86 | 0.87 | 0.87 |
| Wh/Wc | 0.69 | 0.70 | 0.71 | 0.71 |
| Shaft Weight Ws (g) | 60 | 60 | 60 | 60 |
| Shaft Inertia Moment Iss (kg·cm$^2$) | 820 | 820 | 820 | 820 |
| Iss/Ix | 0.117 | 0.112 | 0.110 | 0.108 |
| Shaft Length Lf2 (mm) | 1121 | 1121 | 1121 | 1121 |
| Distance Lf1 from Tip to Center of Gravity of Shaft (mm) | 617 | 617 | 617 | 617 |
| Distance from Butt to Center of Gravity of Shaft (mm) | 504 | 504 | 504 | 504 |
| Lf1/Lf2 | 0.55 | 0.55 | 0.55 | 0.55 |
| Frequency of Club (cpm) | 260 | 260 | 260 | 260 |
| Grip Weight Wg (g) | 25 | 25 | 25 | 25 |
| Grip Inertia Moment Igs (kg·cm$^2$) | 120 | 120 | 120 | 120 |
| Head Speed (m/s) | 46.0 | 45.0 | 44.6 | 43.4 |
| Kinetic Energy (J) | 206.3 | 207.6 | 208.9 | 202.5 |
| Flight distance (yards) | 264 | 270 | 272 | 263 |
| Shaft Durability | A | A | A | A |

TABLE 3

Specifications and Evaluation Results of Examples and Comparative Examples

|  | Comparative Example 3 | Example 3 | Example 4 | Example 1 | Comparative Example 4 |
|---|---|---|---|---|---|
| Club Weight Wc (g) | 259.0 | 259.0 | 264.0 | 291.0 | 296.0 |
| Club Length L1 (inch) | 45 | 45 | 45 | 45 | 45 |
| Inertia Moment Ix about Swing Axis (kg·cm$^2$) | 7050 | 7100 | 7150 | 7300 | 7400 |
| Head Weight Wh (g) | 205 | 205 | 205 | 205 | 205 |
| Head Inertia Moment Ihs (kg·cm$^2$) | 6300 | 6300 | 6300 | 6300 | 6300 |
| Ihs/Ix | 0.89 | 0.89 | 0.88 | 0.86 | 0.85 |
| Wh/Wc | 0.79 | 0.79 | 0.78 | 0.70 | 0.69 |
| Shaft Weight Ws (g) | 40 | 45 | 50 | 60 | 65 |
| Shaft Inertia Moment Iss (kg·cm$^2$) | 550 | 620 | 680 | 820 | 890 |
| Iss/Ix | 0.078 | 0.087 | 0.095 | 0.112 | 0.120 |
| Shaft Length Lf2 (mm) | 1121 | 1121 | 1121 | 1121 | 1121 |
| Distance Lf1 from Tip to Center of Gravity of Shaft (mm) | 617 | 617 | 617 | 617 | 617 |
| Distance from Butt to Center of Gravity of Shaft (mm) | 504 | 504 | 504 | 504 | 504 |

TABLE 3-continued

Specifications and Evaluation Results of Examples and Comparative Examples

|  | Comparative Example 3 | Example 3 | Example 4 | Example 1 | Comparative Example 4 |
|---|---|---|---|---|---|
| Lf1/Lf2 | 0.55 | 0.55 | 0.55 | 0.55 | 0.55 |
| Frequency of Club (cpm) | 260 | 260 | 260 | 260 | 260 |
| Grip Weight Wg (g) | 25 | 25 | 25 | 25 | 25 |
| Grip Inertia Moment Igs (kg·cm$^2$) | 120 | 120 | 120 | 120 | 120 |
| Head Speed (m/s) | 45.8 | 45.7 | 45.5 | 45.0 | 44.4 |
| Kinetic Energy (J) | 215.0 | 214.1 | 212.2 | 207.6 | 202.1 |
| Flight distance (yards) | 280 | 278 | 276 | 270 | 263 |
| Shaft Durability | B | A | A | A | A |

TABLE 4

Specifications and Evaluation Results of Examples and Comparative Example

|  | Example 5 | Example 1 | Comparative Example 5 |
|---|---|---|---|
| Club Weight Wc (g) | 291.0 | 291.0 | 291.0 |
| Club Length L1 (inch) | 45 | 45 | 45 |
| Inertia Moment Ix about Swing Axis (kg·cm$^2$) | 7250 | 7300 | 7350 |
| Head Weight Wh (g) | 205 | 205 | 205 |
| Head Inertia Moment Ihs (kg·cm$^2$) | 6300 | 6300 | 6300 |
| Ihs/Ix | 0.87 | 0.86 | 0.857 |
| Wh/Wc | 0.70 | 0.70 | 0.70 |
| Shaft Weight Ws (g) | 60 | 60 | 60 |
| Shaft Inertia Moment Iss (kg·cm$^2$) | 770 | 820 | 870 |
| Iss/Ix | 0.106 | 0.112 | 0.118 |
| Shaft Length Lf2 (mm) | 1121 | 1121 | 1121 |
| Distance Lf1 from Tip to Center of Gravity of Shaft (mm) | 650 | 617 | 583 |
| Distance from Butt to Center of Gravity of Shaft (mm) | 471 | 504 | 538 |
| Lf1/Lf2 | 0.58 | 0.55 | 0.52 |
| Frequency of Club (cpm) | 260 | 260 | 260 |
| Grip Weight Wg (g) | 25 | 25 | 25 |
| Grip Inertia Moment Igs (kg·cm$^2$) | 120 | 120 | 120 |
| Head Speed (m/s) | 45.2 | 45.0 | 44.5 |
| Kinetic Energy (J) | 209.4 | 207.6 | 203.0 |
| Flight distance (yards) | 272 | 270 | 264 |
| Shaft Durability | A | A | A |

TABLE 5

Specifications and Evaluation Results of Examples

|  | Example 1 | Example 6 | Example 7 |
|---|---|---|---|
| Club Weight Wc (g) | 291.0 | 316.0 | 326.0 |
| Club Length L1 (inch) | 45 | 45 | 45 |
| Inertia Moment Ix about Swing Axis (kg·cm$^2$) | 7300 | 7410 | 7470 |
| Head Weight Wh (g) | 205 | 205 | 205 |
| Head Inertia Moment Ihs (kg·cm$^2$) | 6300 | 6300 | 6300 |
| Ihs/Ix | 0.86 | 0.85 | 0.84 |
| Wh/Wc | 0.70 | 0.65 | 0.63 |
| Shaft Weight Ws (g) | 60 | 60 | 60 |
| Shaft Inertia Moment Iss (kg·cm$^2$) | 820 | 820 | 820 |
| Iss/Ix | 0.112 | 0.111 | 0.110 |
| Shaft Length Lf2 (mm) | 1121 | 1121 | 1121 |
| Distance Lf1 from Tip to Center of Gravity of Shaft (mm) | 617 | 617 | 617 |
| Distance from Butt to Center of Gravity of Shaft (mm) | 504 | 504 | 504 |
| Lf1/Lf2 | 0.55 | 0.55 | 0.55 |
| Frequency of Club (cpm) | 260 | 260 | 260 |
| Grip Weight Wg (g) | 25 | 50 | 60 |
| Grip Inertia Moment Igs (kg·cm$^2$) | 120 | 230 | 290 |
| Head Speed (m/s) | 45.0 | 44.9 | 44.5 |
| Kinetic Energy (J) | 207.6 | 206.6 | 203.0 |
| Flight distance (yards) | 270 | 269 | 264 |
| Shaft Durability | A | A | A |

TABLE 6

Specifications and Evaluation Results of Examples and Comparative Examples

|  | Comparative Example 6 | Example 8 | Example 1 | Example 9 | Comparative Example 7 |
|---|---|---|---|---|---|
| Club Weight Wc (g) | 291.0 | 291.0 | 291.0 | 291.0 | 291.0 |
| Club Length L1 (inch) | 45 | 45 | 45 | 45 | 45 |
| Inertia Moment Ix about Swing Axis (kg·cm$^2$) | 7300 | 7300 | 7300 | 7300 | 7300 |
| Head Weight Wh (g) | 205 | 205 | 205 | 205 | 205 |
| Head Inertia Moment Ihs (kg·cm$^2$) | 6300 | 6300 | 6300 | 6300 | 6300 |
| Ihs/Ix | 0.86 | 0.86 | 0.86 | 0.86 | 0.86 |
| Wh/Wc | 0.70 | 0.70 | 0.70 | 0.70 | 0.70 |
| Shaft Weight Ws (g) | 60 | 60 | 60 | 60 | 60 |
| Shaft Inertia Moment Iss (kg·cm$^2$) | 820 | 820 | 820 | 820 | 820 |
| Iss/Ix | 0.112 | 0.112 | 0.112 | 0.112 | 0.112 |
| Shaft Length Lf2 (mm) | 1121 | 1121 | 1121 | 1121 | 1121 |
| Distance Lf from Tip to Center of Gravity of Shaft (mm) | 617 | 617 | 617 | 617 | 617 |

TABLE 6-continued

Specifications and Evaluation Results of Examples and Comparative Examples

|  | Comparative Example 6 | Example 8 | Example 1 | Example 9 | Comparative Example 7 |
|---|---|---|---|---|---|
| Distance from Butt to Center of Gravity of Shaft (mm) | 504 | 504 | 504 | 504 | 504 |
| Lf1/Lf2 | 0.55 | 0.55 | 0.55 | 0.55 | 0.55 |
| Frequency of Club (cpm) | 230 | 250 | 260 | 280 | 300 |
| Grip Weight Wg (g) | 25 | 25 | 25 | 25 | 25 |
| Grip Inertia Moment Igs (kg·cm$^2$) | 120 | 120 | 120 | 120 | 120 |
| Head Speed (m/s) | 45.2 | 45.1 | 45.0 | 44.9 | 44.4 |
| Kinetic Energy (J) | 209.4 | 208.5 | 207.6 | 206.6 | 202.1 |
| Flight distance (yards) | 251 | 269 | 270 | 269 | 263 |
| Shaft Durability | A | A | A | A | A |

TABLE 7

Specifications and Evaluation Results of Examples and Comparative Examples

|  | Comparative Example 8 | Comparative Example 9 | Example 10 | Example 1 |
|---|---|---|---|---|
| Club Weight Wc (g) | 298.0 | 289.0 | 294.0 | 291.0 |
| Club Length L1 (inch) | 42 | 43 | 43 | 45 |
| Inertia Moment Ix about Swing Axis (kg·cm$^2$) | 6970 | 6870 | 7020 | 7300 |
| Head Weight Wh (g) | 215 | 205 | 210 | 205 |
| Head Inertia Moment Ihs (kg·cm$^2$) | 6050 | 5920 | 6070 | 6300 |
| Ihs/Ix | 0.87 | 0.86 | 0.86 | 0.86 |
| Wh/Wc | 0.72 | 0.71 | 0.71 | 0.70 |
| Shaft Weight Ws (g) | 57 | 58 | 58 | 60 |
| Shaft Inertia Moment Iss (kg·cm$^2$) | 740 | 770 | 770 | 820 |
| Iss/Ix | 0.106 | 0.112 | 0.110 | 0.112 |
| Shaft Length Lf2 (mm) | 1045 | 1070 | 1070 | 1121 |
| Distance Lf1 from Tip to Center of Gravity of Shaft (mm) | 575 | 589 | 589 | 617 |
| Distance from Butt to Center of Gravity of Shaft (mm) | 470 | 482 | 482 | 504 |
| Lf1/Lf2 | 0.55 | 0.55 | 0.55 | 0.55 |
| Frequency of Club (cpm) | 260 | 260 | 260 | 260 |
| Grip Weight Wg (g) | 25 | 25 | 25 | 25 |
| Grip Inertia Moment Igs (kg·cm$^2$) | 120 | 120 | 120 | 120 |
| Head Speed (m/s) | 43.5 | 44.6 | 44.4 | 45.0 |
| Kinetic Energy (J) | 203.4 | 203.9 | 207.0 | 207.6 |
| Flight distance (yards) | 264 | 264 | 269 | 270 |
| Shaft Durability | A | A | A | A |

TABLE 8

Specifications and Evaluation Results of Example and Comparative Examples

|  | Comparative Example 10 | Comparative Example 11 | Example 11 | Comparative Example 12 |
|---|---|---|---|---|
| Club Weight Wc (g) | 294.0 | 279.0 | 274.0 | 265.0 |
| Club Length L1 (inch) | 48 | 48 | 48 | 49 |
| Inertia Moment Ix about Swing Axis (kg·cm$^2$) | 7930 | 7450 | 7460 | 7340 |
| Head Weight Wh (g) | 205 | 190 | 195 | 185 |
| Head Inertia Moment Ihs (kg·cm$^2$) | 6840 | 6340 | 6500 | 6350 |
| Ihs/Ix | 0.86 | 0.85 | 0.87 | 0.87 |
| Wh/Wc | 0.70 | 0.68 | 0.71 | 0.70 |
| Shaft Weight Ws (g) | 63 | 63 | 53 | 54 |
| Shaft Inertia Moment Iss (kg·cm$^2$) | 910 | 910 | 780 | 810 |
| Iss/Ix | 0.115 | 0.122 | 0.105 | 0.110 |
| Shaft Length Lf2 (mm) | 1197 | 1197 | 1197 | 1222 |
| Distance Lf1 from Tip to Center of Gravity of Shaft (mm) | 658 | 658 | 658 | 672 |

TABLE 8-continued

Specifications and Evaluation Results of Example and Comparative Examples

|  | Comparative Example 10 | Comparative Example 11 | Example 11 | Comparative Example 12 |
|---|---|---|---|---|
| Distance from Butt to Center of Gravity of Shaft (mm) | 539 | 539 | 539 | 550 |
| Lf1/Lf2 | 0.55 | 0.55 | 0.55 | 0.55 |
| Frequency of Club (cpm) | 260 | 260 | 260 | 260 |
| Grip Weight Wg (g) | 25 | 25 | 25 | 25 |
| Grip Inertia Moment Igs (kg · cm$^2$) | 120 | 120 | 120 | 120 |
| Head Speed (m/s) | 44.6 | 46.5 | 46.5 | 47.1 |
| Kinetic Energy (J) | 203.9 | 205.4 | 210.8 | 205.2 |
| Flight distance (yards) | 261 | 263 | 270 | 261 |
| Shaft Durability | A | A | A | A |

[Evaluation Method]
[Moments of Inertia]

The inertia moment Ix was calculated by Equation (1) described above. The club inertia moment Ic was measured using MODEL NUMBER RK/005-002 made by INERTIA DYNAMICS Inc. The inertia moment Iss was calculated by Equation (2) described above. The shaft inertia moment Is was measured using MODEL NUMBER RK/005-002 made by INERTIA DYNAMICS Inc. The inertia moment Igs was calculated by Equation (3) described above. The inertia moment Ig was measured using MODEL NUMBER RK/005-002 made by INERTIA DYNAMICS Inc. The inertia moment Ihs was calculated by Equation (4) described above. The inertia moment Ih was measured using MODEL NUMBER RK/005-002 made by INERTIA DYNAMICS Inc. These calculated values are shown in Tables 2 to 8.

[Frequency of the Club]

Figure 7:
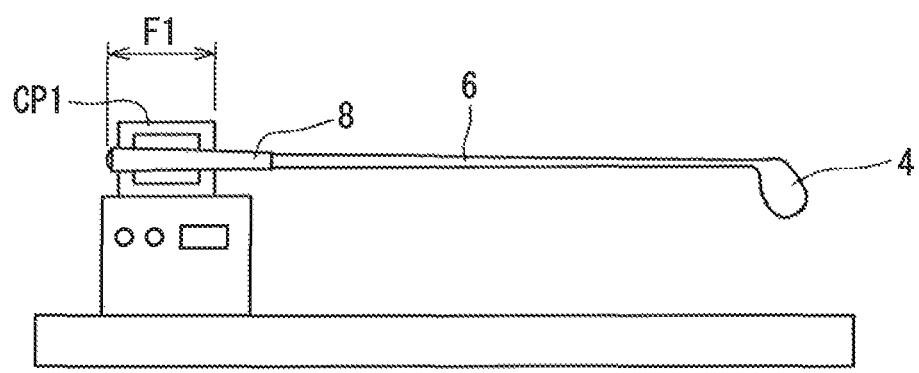
FIG. 7 is a diagram for explaining a method for measuring the frequency of the club.

"GOLF CLUB TIMING HARMONIZER" (trade name) made by Fujikura Rubber Ltd. was used for measuring the frequency of the club. FIG. 7 is a diagram for explaining a method for measuring the frequency of the club. A portion from a point 7 inches from the grip end to the grip end was fixed using a clamp CP1. That is, a length F1 of the fixed portion was 7 inches (about 178 mm). A given load was applied to the head 4 downward, and the shaft 6 was vibrated. The frequency of vibration per minute is the frequency of the club (cpm). The measured values are shown in Tables 2 to 8 above.

[Head Speed]

Five testers whose handicap was equal to or greater than 0 and equal to or less than 10 conducted the evaluation. The general head speeds of these five testers were 42 to 48 (m/s). The head speed of the five testers is relatively fast. Each tester hits a ball with each club for ten times. Therefore, hits were made for 50 times for each of the clubs in total. In the hits, the head speed was measured in impact. The mean values of 50 items of data are shown in Tables 2 to 8.

[Kinetic Energy]

The kinetic energy (J) was calculated using the obtained mean value of the head speed. The calculated values are shown in Tables 2 to 8. The calculation equation of the kinetic energy K is as follows, if the head weight is defined as Wh, and the head speed (the mean value) is defined as Vh:

$$K = Wh \times (Vh)^2 / 2$$

[Flight Distance]

From the viewpoint of improving the reliability of data, two hits of small flight distances were not adopted in the ten hits described above. As a result, 40 items of data for flight distance were obtained. It is noted that this flight distance is a distance (a so-called carry) to a spot at which a ball falls to the ground. The mean values of 40 items of data are shown in Tables 2 to 8.

[Shaft Durability]

The club was mounted on a swing robot made by Miyamae Co., Ltd., and the head speed was set at 52 m/s. A point to hit was at a position 20 mm apart from the face center to the heel side. "DDH TOUR SPECIAL" made by DUNLOP SPORTS CO. LTD. was used as the golf balls. The balls were repeatedly hit, and the state of the shaft was confirmed for every 500 hits. The shaft was evaluated as "A" in the case where the shaft was not damaged after 10,000 hits. In the case where breakage was confirmed before 10,000 hits, the shaft was evaluated as "B". These evaluations are shown in Tables 2 to 8.

In the case where the ratio Iss/Ix was great, the kinetic energy of the head was not enough increased, and the flight distance was short (see comparative example 1, comparative example 4, comparative example 5, and comparative example 11).

In the case where the club inertia moment Ix was great, the head speed was less increased, and the flight distance was short (see comparative example 2 and comparative example 10).

In the case where the ratio Iss/Ix was small, the shaft durability was apt to decrease (see comparative example 3).

In the case where the ratio Iss/Ix was great and the shaft inertia moment Iss was also great, the flight distance was apt to decrease (see comparative example 4 and comparative example 5).

In the case where the ratio Lf1/Lf2 was small, the flight distance was apt to decrease (see comparative example 5).

In the case where the grip inertia moment Igs was great, the kinetic energy of the head was apt to decrease (see example 7).

In the case where the frequency of the club was small, the behavior of the shaft becomes unstable during a swing, and the meeting ratio was apt to decrease. Moreover, the ease of a swing was decreased because of the behavior of the shaft. Therefore, the flight distance was short (see comparative example 6). The meeting ratio means a probability that a ball is hit at a sweet spot.

In the case where the frequency of the club was great in a swing, the flexure of the shaft was excessively small. Furthermore, the ease of a swing was decreased because of the excessively small flexure. Due to these factors, the head speed was decreased, and the flight distance was short (see comparative example 7).

In the case where the club length L1 was too short, the radius rotation of a swing became small, and the head speed was decreased (see comparative example 8).

Even though the head weight Wh was decreased to reduce the moment Ix, the kinetic energy was decreased in the case where the ratio Iss/Ix was great. Therefore, the flight distance was decreased (see comparative example 11).

In the case where the club length L1 was excessively long, the meeting ratio was decreased, and the flight distance was short (see comparative example 12).

As shown in the evaluation results, the superiority of the present invention is apparent.

The method described above is applicable to golf clubs.

The description above is merely an example, and can be variously modified within the scope not deviating from the principles of the present invention.

What is claimed is:

1. A golf club comprising:
a head, a shaft, and a grip on the golf club grip end, wherein:
the golf club has a length that is equal to or greater than 43 inches and equal to or less than 48 inches;
the golf club has a frequency that is equal to or greater than 240 (cpm) and equal to or less than 290 (cpm);
if a shaft inertia moment about a swing axis is defined as Iss (kg·cm$^2$), a club inertia moment about the swing axis is defined as Ix (kg·cm$^2$), and the club inertia moment Ix is equal to or greater than 6.90×10$^3$ (kg·cm$^2$) and equal to or less than 7.50×10$^3$ (kg·cm$^2$), then a ratio Iss/Ix is equal to or greater than 0.085 and equal to or less than 0.115;
the inertia moment Ix being calculated by Equation (1), and the inertia moment Iss being calculated by Equation (2):

$$Ix = Wc \times (Lc+60)^2 + Ic \quad (1)$$

$$Iss = Ws \times (Ls+60)^2 + Is \quad (2)$$

wherein the golf club weight is defined as Wc (kg), the golf club axial direction distance from the grip end to a center of gravity of the club is defined as Lc (cm), a club inertia moment about the center of gravity of the club is defined as Ic (kg·cm$^2$), the shaft weight is defined as Ws (kg), the shaft axial direction distance from the grip end to a center of gravity of the shaft is defined as Ls (cm), and a shaft inertia moment about the center of gravity of the shaft is defined as Is (kg·cm$^2$); and
wherein if a static moment of the club is defined as Mt (kg·cm$^2$) and the static moment Mt is calculated by Equation (5):

$$Mt = Wc \times (Lc-35.6) \quad (5).$$

then a ratio Ix/Mt is equal to or greater than 415 and equal to or less than 442.

2. The golf club according to claim 1, wherein the shaft inertia moment Iss (kg·cm$^2$) is equal to or less than 900.

3. The golf club according to claim 1, wherein:
a grip inertia moment Igs (kg·cm$^2$) about the swing axis is equal to or less than 280; and
the inertia moment Igs is calculated by Equation (3):

$$Igs = Wg \times (Lg+60)^2 + Ig \quad (3)$$

wherein the grip weight is defined as Wg (kg), an axial direction distance from the grip end to a center of gravity of the grip is defined as Lg (cm), and a grip inertia moment about the center of gravity of the grip is defined as Ig (kg·cm$^2$).

4. The golf club according to claim 1, wherein if an axial direction distance from a shaft tip end to the center of gravity of the shaft is defined as Lf1, and a shaft length is defined as Lf2, then a ratio Lf1/Lf2 is equal to or greater than 0.55 and equal to or less than 0.67.

5. A golf club comprising:
a head, a shaft, and a grip on the golf club grip end, wherein:
the golf club has a length that is equal to or greater than 43 inches and equal to or less than 48 inches;
the golf club has a frequency that is equal to or greater than 240 (cpm) and equal to or less than 290 (cpm);
if a shaft inertia moment about a swing axis is defined as Iss (kg·cm$^2$), a club inertia moment about the swing axis is defined as Ix (kg·cm$^2$), and the club inertia moment Ix is equal to or greater than 6.90×10$^3$ (kg·cm$^2$) and equal to or less than 7.50×10$^3$ (kg·cm$^2$), then a ratio Iss/Ix is equal to or greater than 0.085 and equal to or less than 0.115;
the inertia moment Ix being calculated by Equation (1), and the inertia moment Iss being calculated by Equation (2):

$$Ix = Wc \times (Lc+60)^2 + Ic \quad (1)$$

$$Iss = Ws \times (Ls+60)^2 + Is \quad (2)$$

wherein the golf club weight is defined as Wc (kg), the golf club axial direction distance from the grip end to a center of gravity of the club is defined as Lc (cm), a club inertia moment about the center of gravity of the club is defined as Ic (kg·cm$^2$), the shaft weight is defined as Ws (kg), the shaft axial direction distance from the grip end to a center of gravity of the shaft is defined as Ls (cm), and a shaft inertia moment about the center of gravity of the shaft is defined as Is (kg·cm$^2$); and
wherein the club static moment Mt is equal to or greater than 16.3 kg·cm and equal to or less than 18.0 kg·cm, and the static moment Mt is calculated by Equation (5):

$$Mt = Wc \times (Lc-35.6) \quad (5).$$

* * * * *